J. H. WILDER.
TARGET TRAP.
APPLICATION FILED JAN. 26, 1912.
1,038,700.
Patented Sept. 17, 1912.
2 SHEETS—SHEET 2.
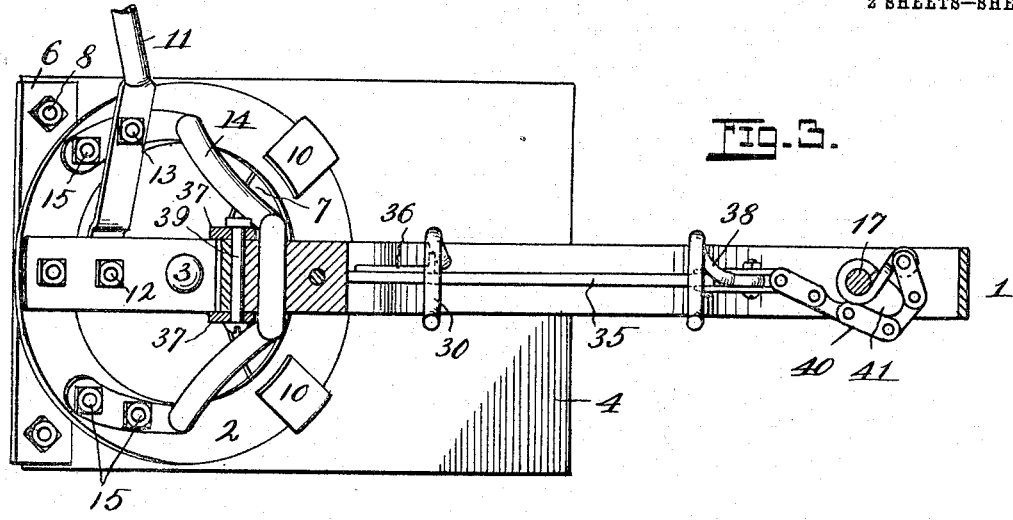
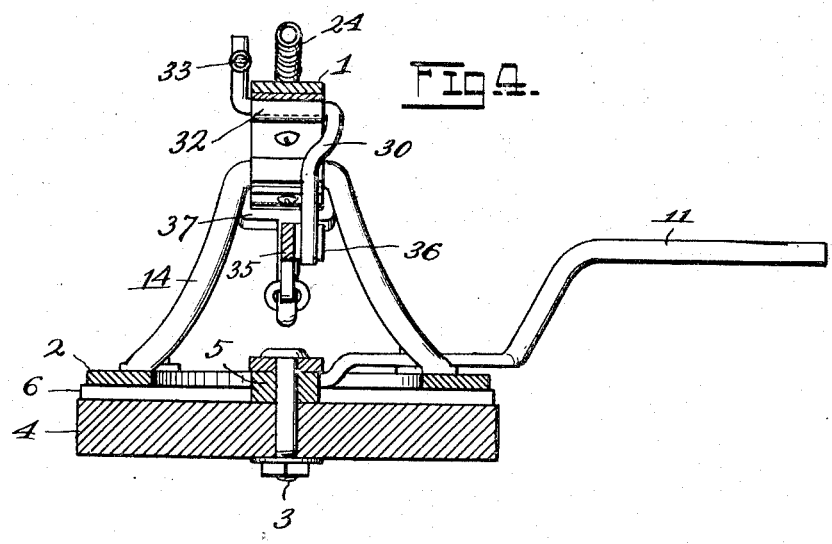
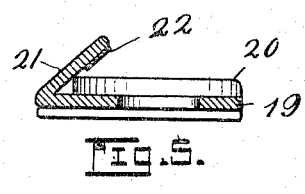
WITNESSES:
INVENTOR:
James H. Wilder,
BY
F. G. Fischer,
ATTORNEY

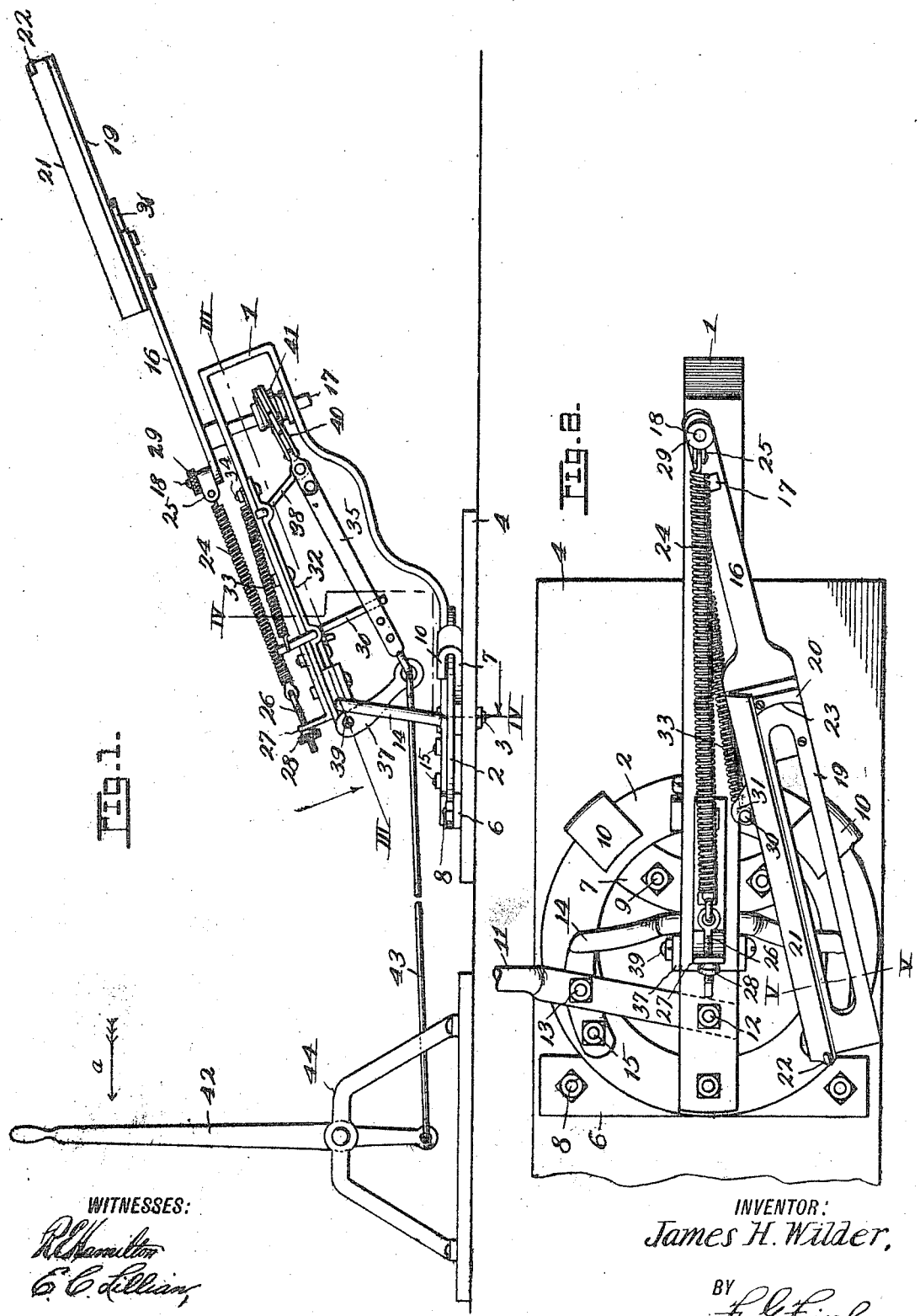

UNITED STATES PATENT OFFICE.

JAMES HARVEY WILDER, OF RANDALL, KANSAS.

TARGET-TRAP.

1,038,700.  Specification of Letters Patent.  Patented Sept. 17, 1912.

Application filed January 26, 1912. Serial No. 673,587.

*To all whom it may concern:*

Be it known that I, JAMES H. WILDER, a citizen of the United States, residing at Randall, in the county of Jewell and State of Kansas, have invented certain new and useful Improvements in Target-Traps, of which the following is a specification.

My invention relates to improvements in traps for throwing clay pigeons or targets, and my object is to produce a simple, strong and reliable trap of this character, free from cables, and which may be readily adjusted to throw a target in any desired direction.

The invention provides for throwing a plurality of targets at the same time, and in order that the invention may be fully understood, reference will now be made to the accompanying drawings, in which:

Figure 1 is a side elevation of the trap, ready for use, with the throwing-arm extended. Fig. 2 is an enlarged plan view of the trap with the throwing-arm folded preparatory to throwing a target. Fig. 3 is a longitudinal section on line III—III of Fig. 1. Fig. 4 is an irregular vertical section on line IV—IV of Fig. 1. Fig. 5 is a cross section of the target-holder, on line V—V of Fig. 2.

1 designates the main frame of the machine, which is, substantially, U-shaped in configuration.

2 designates a circular base to which the lower leg of frame 1 is fixed, said base being rotatably-mounted upon a centrally-disposed bolt 3, extending through the lower leg of frame 1 and a base-board 4, a sleeve 5 being interposed between frame 1 and said board, as shown in Fig. 4. All tendency of base 2 to tip upon bolt 3 is overcome by a transverse bar 6 and a yoke 7, secured by bolts 8 and 9, respectively, to the base-board 4. Bar 6 underlies one side of base 2 and yoke 7 underlies the opposite side of said base, and has up and inturned terminals 10 overlapping said base, as shown in Figs 1 and 2. Frame 1 and base 2 are rotated, to throw the target to the right or to the left, by a handle 11, secured to the lower leg of the frame and one side of base 2, by bolts 12 and 13, respectively. The rear terminal of the upper leg of frame 1 is supported by a yoke 14, secured to opposite sides of base 2, by bolts 13 and 15.

16 designates the throwing-arm which is fixedly-mounted near its rear end upon a shaft 17, journaled in the upper forward portions of frame 1 and having an upturned terminal 18 at its rear end, and a target-holder 19 secured to its forward end. Target-holder 19 is of sufficient length to hold two or more targets, so that a number of targets may be thrown at the same time. Said target-holder has an abutment 20, near its fixed end, and a longitudinal inwardly-inclined flange 21 at its rear margin, which flange has a longitudinal cushion 22 for the adjacent sides of the targets to rest against. Abutment 20 has a curved edge 23 to receive the innermost target, and flange 21 prevents the targets from falling off the rear side of holder 19, when the latter sweeps around at high speed to throw the targets therefrom. Holder 19 is actuated by a coil-spring 24, secured at one end to a clip 25, and at its opposite end to a tension-screw 26, extending through a lug 27 and provided with a nut 28, whereby it may be adjusted backward or forward to tension the spring 24. Clip 25 is swiveled upon the upturned end 18 of the throwing arm 16, it being held upon said upturned end by a nut 29.

30 designates a trigger, adapted to engage a catch 31, on the throwing-arm 16, to hold the same in the set position shown in Fig. 2, preparatory to throwing a target, or targets. Trigger 30 is pivotally-mounted in a bearing 32, secured to the underside of the upper leg of frame 1, and the upper portion of said trigger is yieldingly-held in engagement with the catch 31, by a coil-spring 33, secured at one end to the upper terminal of the trigger, and at its opposite end to a bolt 34, which assists in securing bearing 32 to frame 1. Trigger 30 is disengaged from catch 31, by a releasing-bar 35, provided at one side with a laterally-projecting lug 36, adapted to engage the lower terminal of the trigger. The releasing-bar is swingingly-supported at its upper and lower terminals by links 37 and 38, respectively, the former being pivotally-secured by a bolt 39, to the rear terminal of the upper leg of frame 1, and the former being pivotally-mounted in the upper portion of bearing 32.

40 designates a chain connecting the upper end of the releasing-bar 35, to shaft 17, which latter is provided with a fixedly-mounted crank 41, engaging said chain to take up the same and thus limit the sweep of the throwing-arm after catch 31 has been released from the trigger 30. The releasing-bar 35 is advanced to disengage trigger 30 from catch 31, by a hand-lever 42 and a connecting-rod 43, the former of which is pivotally-mounted upon a bracket 44 at the rear of base-board 4, and the latter being connected at its rear end to the hand-lever and the lower end of link 37. In order to set the trap, the throwing-arm 16 and the holder 19 are swung backward until the catch 31 engages the upper portion of trigger 30, as shown in Fig. 2. To throw the target, lever 42 is thrown in the direction of arrow $a$, which movement pushes the releasing-bar 35 forward and causes it, through the intermediacy of lug 36, to swing the trigger 30 out of engagement with the catch 31, when arm 16 is immediately swung around at high speed, to discharge the target or targets, by the spring 24. As the throwing-arm 16 sweeps around chain 40 is drawn taut by the rotating crank 41 until stopped by link 37 striking against the upper transverse portion of yoke 14.

Having thus described my invention what I claim and desire to secure by Letters Patent, is:

1. In a target trap, a base board, a circular base rotatably connected to the base board, a transverse member on the base board which underlies one side of the base, a yoke centrally secured to the base board and underlying the opposite side of the base, said yoke having its ends turned inwardly so as to engage on the top face of the base, a yoke secured to the base and extending upwardly therefrom, a substantially U-shaped inclined frame having the free end of its lower leg secured to the base and having the free end of its upper leg secured to the top of the second mentioned yoke, a shaft projected through both legs of the frame at its outer end, a throwing arm fixedly secured to the shaft above the upper leg of the frame, a spring connected to the throwing arm and to the upper leg of the frame, a trigger carried by the upper leg of the frame, and means to operate the trigger.

2. In a target trap, in combination with a frame, having an inclined leg portion, and a spring throwing arm pivotally connected to said leg portion and having a catch, a trigger having a horizontal portion that extends across the leg portion and is movably connected thereto, one end of said trigger being turned upwardly to engage the catch of the throwing arm, the other end of said trigger being bent downwardly, a releasing bar, links for swingingly supporting said bar from said leg portion of the frame, said releasing bar having a perforated lug that receives the downturned end of the trigger, and a spring connected to the top extremity of the upturned end of the trigger and to the leg portion of the frame.

3. In a trap, in combination with a base board, a circular base rotatably connected to the base board, a member on the base board on which one side of the base rests, a second member on the base board on which the base rests at the opposite side of the latter, said second member having guide portions which engage on top of the base, a vertical member secured to the base, a substantially U-shaped frame having one end secured to the top portion of the vertical member and having its other end secured to the base, and throwing means carried by said frame.

In testimony whereof I affix my signature, in the presence of two witnesses.

JAMES HARVEY WILDER.

Witnesses:
 CARL JUDGE,
 W. E. CARNAHAN.